April 4, 1933.   H. M. BRAMBERRY   1,903,396
PISTON AND PISTON RING THEREFOR
Filed July 25, 1929
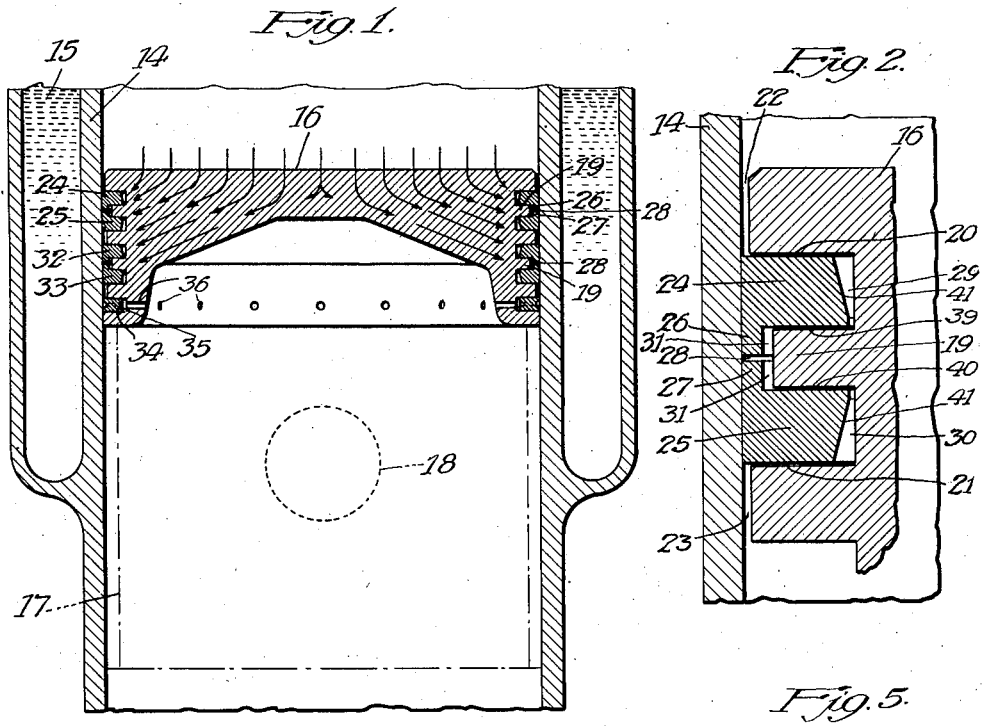
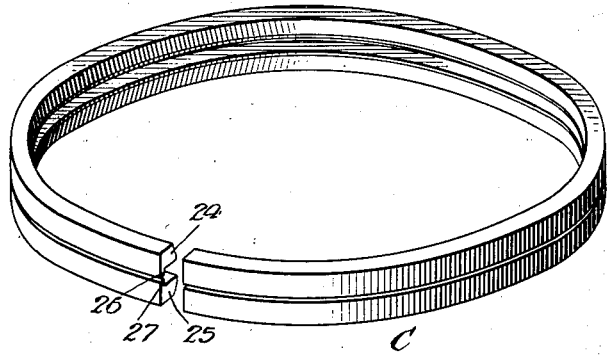
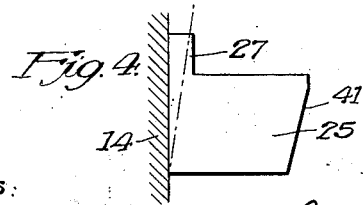
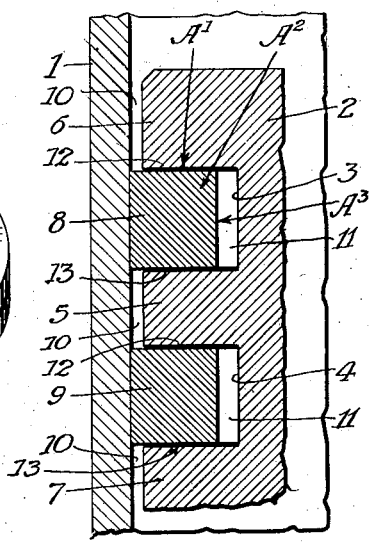
Witness:
R. B. Davison
Inventor:
Harry M. Bramberry
By Rector, Hibben, Davis and Macauley
Attys.

Patented Apr. 4, 1933

1,903,396

UNITED STATES PATENT OFFICE

HARRY M. BRAMBERRY, OF NEWCASTLE, INDIANA, ASSIGNOR TO PISTON RESEARCH CORPORATION, OF NORFOLK, VIRGINIA, A CORPORATION OF VIRGINIA

PISTON AND PISTON RING THEREFOR

Application filed July 25, 1929. Serial No. 380,952.

My invention relates to internal combustion or other compression engines and more particularly to pistons and piston rings therefor.

The principal object of my invention is to provide a compression packing ring structure which will cooperate with the piston to seal effectively the piston and ring groove at all engine speeds and temperatures, while at the same time reducing the oil consumption, improving lubrication of the parts, minimizing friction, accomplishing efficient heat transfer from the piston to the cylinder wall, and lengthening the life of the various parts.

More particularly, the main object of my invention is to provide a compression ring structure and cooperating ring groove on the piston which will permit the inherent resiliency of the ring structure to act freely in the groove under all conditions of operation so that the structure constantly and uniformly follows the cylinder wall and films of lubricant are maintained between the ring structure and the cylinder wall and the ring structure and the groove surfaces with the above mentioned attendant advantages. To this end, I so design the ring structure and ring-receiving groove that the ring structure feathers or scrapes the lubricant from the cylinder wall and conveys the same to the interior of the ring structure where it is trapped to thoroughly lubricate the ring structure in the groove, while assuring the desired lubricating film between the cylinder wall and the contacting face of the ring structure.

In the preferred embodiment of the invention, the piston is provided with an annular rib which is normal to the piston axis and projects into the ring receiving groove. This rib is spaced apart from the outer and flat sides of the groove and engages and positions the ring structure to prevent material bodily movement thereof along and with respect to the piston. The ring structure itself is preferably inclusive of two separately formed rings, each substantially L-shaped in cross section and with the cylindrical branches thereof engaging the cylinder and extending toward each other. The aforesaid rib engages the flat branches of the rings to position the rings and maintain the cylindrical branches thereof apart to afford a narrow passage that extends through the piston ring structure from the exterior cylindrical surface thereof. The cylindrical branches are spaced from the periphery of the rib to form an annulus lubricant-receiving space which is in communication with said passage, lubricant being feathered or scraped from the cylinder wall by the cylindrical branches and conveyed through said passage into said space which acts as a trap or lubricant well.

I will explain my invention more fully by reference to the accompanying drawing in which, Fig. 1 is a longitudinal sectional view of a portion of an internal combustion engine equipped in accordance with the preferred embodiment of the invention;

Fig. 2 is an enlargement of a portion of the structure as it is illustrated in Fig. 1;

Fig. 3 is a perspective view of the preferred form of ring structure;

Fig. 4 is an enlarged cross section through one of the rings of the ring structure; and Fig. 5 is a fragmentary sectional view which is illustrative of the structure of the prior art.

Before describing my invention more specifically, the prior art upon which it is an improvement will be discussed in connection with Fig. 5. In this figure I have illustrated a portion 1 of the cylindrical wall of a cylinder, such as may be employed, for example, in an internal combustion engine. I have also illustrated a portion 2 of a piston which is reciprocable within the cylinder. This piston is provided with two spaced apart ring receiving grooves 3 and 4 which are of equal depth radially of the piston and of equal width. A land 5 separates the two grooves and is of the same diameter as the outer land 6. The portion 7 of the piston shows a part of another land of the same diameter as lands 5 and 6. There is usually an oil control ring below the lower compression ring in accordance with common practice, the latter being perforate to the interior of the piston. Ordinary resilient compression packing rings 8 and 9, rectangular in cross section, are respectively disposed in the grooves 3 and 4. Annular clearances 10 intervene between the piston and the surrounding cylinder wall 1. Said compression rings 8 and 9 extend across said clearances into engagement with the cylindrical wall 1, this cylindrical wall holding these rings under contraction. There are the usual clearance or lubricant receiving spaces 11 between the inner cylindrical faces of the rings and the opposed cylindrical sides of the grooves. It is desirable to trap lubricant in the spaces 11 sufficiently to enable this lubricant to lubricate the flat or sealing faces of the rings and the adjacent flat faces of the grooves, these flat faces serving as plane sealing surfaces. It is difficult, however, to so trap the lubricant in said spaces 11 where an engine equipped as illustrated in Fig. 5 is operating at high speed and under high compression. The failure of the structure illustrated in Fig. 5 will be understood from the following explanation and under the assumption that such structure is employed in an internal combustion engine. The explosion pressure is exerted upon the ring 8 in the direction of the arrow A', this pressure being aggravated because of the necessarily high clearance 10 between the land 6 and the cylinder 1. The explosion and compression pressures as well as the hot gases of combustion, when the engine is operating under high compression and at high speed, displace or blow the lubricant from between the adjacent flat surfaces at 12 of the ring 8 and groove 3 and out of the adjacent spacing 11 and through the adjacent flat faces at 13 of said ring and groove, this lubricant passing into the portion of the clearance 10 that is between the two rings where it is consumed in operation of the engine.

Radial pressure acts outwardly against the inner cylindrical face of the ring 8, as indicated by the arrow $A^3$. A resultant of the pressures indicated by arrows $A'$ and $A^3$ is effective upon the ring 8, as indicated by the arrow $A^2$. The pressure at the surfaces 13 being highest after the lubricant has been blown out makes the presence of lubricant at these surfaces more imperative and when the engine is operating under high compression and at high speed, the component pressure $A^2$ is so great as to hold the surfaces at 13 so intimately in contact as to prevent the ring 8 from acting radially to follow the cylinder wall uniformly. That is, the ring is prevented from responding to its own resilience sufficiently to maintain proper proximity to the cylinder wall during the reciprocation of the piston. As far as I am aware the prior art shows no way by which lubricant can be restored to the surfaces at 13 and to the space 11 within the ring 8 without slowing down or throttling the engine, whereby the vacuum of the intake stroke will serve again to supply lubricant at said surfaces and to said space, it being a well known fact that lubricant is sucked or finds its way behind the rings to the combustion chamber at slow speeds with the type of structure shown in Fig. 5, with the attendant disadvantage that the heavy ends of the fuel find their way to the crank case to dilute the lubricant. Excessive oil consumption, "blow-by", loss of power, and fast rate of wear of the cylinders and of the rings and grooves (caused by higher radial and downward pressures and inadequate lubrication) result with the structures of the prior art. Ring 9 functions similarly to ring 8, as will be understood.

I will now describe the preferred embodiment of the invention in connection with Figs. 1, 2 and 3. I have illustrated a portion 14 of the cylindrical wall of a cylinder, such as may be employed, for example, in an internal combustion engine. This cylinder is shown as being surrounded by a water containing engine cooling jacket 15. I have also illustrated, in full lines, a portion 16 of a piston which is reciprocable within the cylinder. This piston may be equipped with a skirt continuation 17 which I have indicated by dotted lines, a wrist pin hole 18 being also indicated by dotted lines.

This piston is provided with a circumscribing annular ring receiving groove and an annular rib 19 which is normal to the piston axis and imparts to the groove a C-shape form with two channels. This rib is within the groove and is spaced equally from the flat faces 20 and 21 of the groove that are also normal to the piston axis. Annular clearances 22, 23 intervene between the cylinder 14 and the portions of the piston that margin the aforesaid groove, these clearances being substantially of the same width. The rib 19 is of lesser diameter than the portions of the piston between which the ring receiving groove is disposed, this ring receiving groove being somewhat in the shape of a letter C. The piston is imperforate at the groove and between it and the piston interior.

The resilient compression packing ring structure which is disposed within said groove is preferably inclusive of two separately formed rings 24 and 25, each substantially L-shaped in cross section, and with the cylindrical branches 26, 27 thereof extending toward each other and engaging the cylinder. The rib engages the flat branches of the rings to hold the cylindrical branches 26, 27 of these rings spaced apart to provide the lubricant conveying passage 28 that extends through the ring structure, the lubricant receiving spacings 29, 30 and 31 which are within the piston ring structure occurring respectively between the inner cylindrical faces of both the flat and cylindrical branches of the piston rings and the opposed portions of the piston. Said passage 28 may completely encircle the rib 19, a characteristic which may be employed because of the separate formation of the rings. This passage 28 has direct communication with the spacing 31 and indirect communication with the spacings 29 and 30. The rings project radially of and beyond the piston into engagement with the cylinder, the cylinder holding the rings under contraction. The flat branches of the rings have flat faces which are normal to the axis of the ring, the outermost two of these faces being spaced apart a distance closely approximating the width of the aforesaid groove measured between its flat faces 20 and 21, the two innermost flat faces of these rings being in close proximity to the flat faces of the rib 19, the result being that the piston ring structure, as a whole, is prevented from having material bodily movement with respect to the piston although access of lubricant between the flat faces of the ring structure and the adjacent flat faces of the piston is permitted.

The annular passage 28 is prevented from ever being closed by means of the spacing rib 19, this passage being maintained at all speeds of the engine. Such passage may have a width, measured along the axis of the piston, of .004 inch to .020 inch when the ring structure is under operating pressures, this dimension varying with the varying diameters of the piston and with different working conditions, the dimensions given obtaining in the average automobile engine. Proper clearance is afforded at the passage 28 to entrap or feather sufficient oil or lubricant from the cylinder wall for sealing, lubricating and heat transfer purposes.

An oil ring 34 is also illustrated in the innermost piston ring receiving groove 35, this latter groove having communication with the interior of the piston by way of the passages 36.

The structure thus far described is detailed in Fig. 2. Fig. 1 shows a duplicate of this, it being sufficient to designate the rings 32, 33 of the duplicated structure whose environment is similar to that of the rings 24 and 25.

The heat absorbed by the piston head 16, Fig. 1, is distributed through direct paths as indicated by the heat flow arrows, Fig. 1, to substantially the entire compression ring structure; this structure has sufficient edge and face contact on the piston head 16 and cylinder wall 14, together with the entrapped lubricant therein, to so effectively transfer and dispose of the heat absorbed and distributed to it, that the piston head temperatures can be controlled so as to not exceed the cracking point of good lubricant, this being a highly satisfactory advantage. The entrapped lubricant is highly responsible for the attainment of this result.

By the use of sufficient quantity of metal in the piston head suitably shaped in cross section together by the use of definite proportions of ring edge and face areas in definable relations to piston head areas and diameters, and my oil trapping arrangement of ring and groove structure, the piston head temperatures may be predetermined and satisfactorily controlled.

The explosion and compression pressures and hot gases enter the clearance 22. These pressures and hot gases act in a downward or inward direction and would have the effect hitherto described in connection with Fig. 5 were it not for the entrapping of lubricant which my structure enables. This downward pressure must be dealt with, as it causes high pressure at the flat sealing faces opposite the combustion chamber as at 39. It is necessary to provide a lubricant for these faces to enable the ring structure to respond and act radially and with a given spring tension under maximum operating conditions. The passage 28 enables the procurement of this result. The lubricant is filmed or scraped from the wall 14 and is passed into the spacing 31 from which the flat faces at 39 and 40 are supplied with lubricant. This spacing 31 also feeds or supplies the spacings 29 and 30 and from these spacings 29 and 30 the faces at 20 and 21 are also lubricated. The whole piston ring and groove structure thus works under a more or less hydraulic seal.

My structure differs materially from that of the prior art as illustrated in Fig. 5. A land such as 5, Fig. 5, is necessary for spacing and separating rings 8 and 9, it being of less diameter than the piston skirt and forming a clearance such as 10, Fig. 5, between the land and cylinder wall. This clearance is no more than a space into which lubricant or fluid is blown more especially from behind the upper ring as before explained.

My structure provides means to prevent the above condition by partially filling the space between the cylinder wall and the periphery of the rib (which for the purpose of comparison may be considered as corresponding to the land 5 of Fig. 5) with the baffles 26 and 27 on rings 24 and 25, Fig. 2, and by trapping oil from the cylinder wall through the opening 28 whereby the space 31 is supplied with lubricant as well as those of 29 and 30, thus establishing a labyrinth oil sealing reservoir and packing between the piston and cylinder. At least one plane sealing surface—which in the preferred form shown is at the surface 39, Fig. 2—has been found to be highly desirable between the combustion chamber and the passage through which the oil is trapped from the cylinder wall, thereby preventing direct communication between such passage and the combustion or compression chamber.

The rings may be chamfered as indicated at 41, Fig. 4, to balance the cross sectional strains thereof to compensate for the removal of the stock or counter-bore opposite the chamfers whereby the rings may remain flat when held under contraction by the cylinder. In other words, the chamfering prevents the twisting or distorting of the rings when held under contraction, so that the outer cylinder-contacting faces of the rings are maintained in cylindrical-flush engagement with the cylinder wall. To explain further, I find that when the rings are not chamfered, the pressure exerted because of the L-shape form tends to distort the ring under contraction with the result that its outer cylindrical wall becomes inclined to the cylinder wall (as indicated exaggeratedly by the dotted line C) which is found to be objectionable. The chamfer, however, sets up an opposing strain or pressure acting generally to neutralize such distorting pressure so that the chamfered ring is held perfectly flat and undistorted when under contraction by the cylinder.

The cylindrical ring branches 26 and 27 are very thin, yet they are thick enough for mechanical and manufacturing requirements. The rib is preferably of lesser width (vertically as viewed in the drawing) than the width of each channel on either side so that the vertical dimension of the cylindrical ring branches may be made as small as practical, to facilitate manufacture of the rings and enhance their efficiency. They are made thin to permit the rib 19 to be of as large diameter as possible in order to afford as much edge area in contact with the faces at 39 and 40 as possible. At the same time, these cylindrical branches act as baffles to hold the lubricant between the periphery of the rib and the cylinder wall.

This application is a continuation in part of my application Serial No. 281,219, filed May 28, 1928.

I claim:

1. In an internal combustion or other compression engine having a cylinder, the combination of a piston reciprocable in said cylinder, with an annular clearance intervening between the piston and cylinder, the piston being formed with a circumscribing annular imperforate ring-receiving groove; and a resilient compression packing ring structure within the groove, said ring structure and piston having surfaces cooperating to form a lubricant receiving reservoir which is in communication with the oil film on the cylinder wall through a feathering passage having a width within the approximate range of .004 inch and .020 inch, and the reservoir being sealed from the compression space under pressure conditions.

2. In an internal combustion or other compression engine having a cylinder, the combination of a piston reciprocable in the cylinder, with an annular clearance intervening between the piston and cylinder, the piston being formed with a circumscribing annular ring-receiving groove, and the piston also being imperforate at the groove and between it and the piston interior; and a resilient compression packing ring structure including two separate rings within said groove, the ring structure having a narrow communicating spacing between the two rings at the cylinder engaging side of the structure for feathering the lubricant from the cylinder wall, the ring structure also providing an annular space into which the lubricant so feathered is directed, the annular space being sealed from the combustion space under pressure conditions.

3. In an internal combustion or other compression engine having a cylinder, the combination of a piston reciprocable in said cylinder, with an annular clearance intervening between the piston and cylinder, the piston being formed with a circumscribing annular ring-receiving groove having a rib imparting to the groove a C-shape form with two channels; and a resilient compression packing ring structure within the groove, having two portions which extend into said channels and providing an annular space at the periphery of the rib, the structure also having in the plane of the rib narrow communicating spacing of a width within the approximate range of .004 inch to .020 inch whereby lubricant is feathered from the cylinder wall into said annular space.

4. In an internal combustion or other compression engine having a cylinder, the combination of a piston reciprocable in the cylinder, with an annular clearance intervening between the piston and cylinder, the piston being formed with a circumscribing annular ring-receiving groove having a rib imparting to the groove a C-shape form with two channels; and a resilient compression packing ring structure comprising two non-contacting rings, one seated in each channel and at least one of which has a cylindrical branch in engagement with the cylinder wall and extending toward the other to provide a narrow slot between the two rings and an annular space behind said cylindrical branch and in communication with said slot.

5. In an internal combustion or other compression engine having a cylinder, the combination of a piston reciprocable in the cylinder, with an annular clearance intervening between the piston and cylinder, the piston being formed with a circumscribing annular ring-receiving groove having a rib imparting to the groove a C-shape form with two channels and the piston being imperforate at the groove and between it and the piston interior; and a resilient compression packing ring structure in the groove comprising two rings having flat branches seated in said channels and cylindrical branches engaging the cylinder wall and providing an annular lubricant space between said cylindrical branches and the periphery of said rib, the rib serving to hold said cylindrical branches out of contact with each other to provide a narrow slot therebetween and in communication with said annular space.

6. In an internal combustion or other compression engine having a cylinder, the combination of a piston reciprocable in the cylinder, with an annular clearance intervening between the piston and cylinder, the piston being formed with a circumscribing annular ring-receiving groove having a rib imparting to the groove a C-shape form with two channels and the piston being imperforate at the groove and between it and the piston interior; and a resilient compression packing ring structure in the groove comprising two L-shaped rings with the flat branches of the rings seated in said channels and the cylindrical branches thereof engaging the cylinder wall and extending toward each other and providing an annular lubricant space between said cylindrical branches and the periphery of said rib, the rib serving to hold said cylindrical branches out of contact with each other to provide a narrow slot therebetween and in communication with said annular space, the width of the slot being within the range of approximately .004 inch to .020 inch, and annular lubricant spaces also being provided between the interior faces of said branches and the cylindrical faces of said channels.

7. In an internal combustion or other compression engine having a cylinder, the combination of a piston reciprocable in the cylinder, with an annular clearance intervening between the piston and cylinder, the piston being formed with a circumscribing annular ring-receiving groove having a rib imparting to the groove a C-shape form with two channels, the flat sides of which are parallel to each other and radial to the axis of the piston and the piston being imperforate at the groove and between it and the piston interior; and a resilient compression packing ring structure within said groove including two rings each having its flat faces parallel and spaced apart a distance closely approximating the width of one of said channels in which it is positioned to prevent material bodily movement of the respective ring along and with respect to the piston while permitting access of lubricant between the flat faces of the ring and its respective channel, said rings having cylindrical branches engaging the cylinder wall and extending over but spaced from said rib to form a slot having a width of approximately .010 inch and an annular lubricant space between said branches and the periphery of the rib.

8. In an internal combustion or other compression engine having a cylinder, the combination of a piston reciprocable in the cylinder with an annular space intervening between the piston and cylinder, the piston being formed with a circumscribing annular ring-receiving groove having a rib imparting to the groove a C-shape form with two channels, each channel being wider than the rib; and a resilient compression packing ring structure comprising two rings, one seated in each channel and of a width approximating the width of the channel to prevent material bodily movement of the respective ring along and with respect to the piston while permitting access of lubricant between the flat faces of the ring and its respective channel, each ring also providing between its inner cylindrical side and the cylindrical wall of the respective channel an annular lubricant space, and at least one of said rings having a cylindrical branch in engagement with the cylinder wall and extending toward the other ring to provide a narrow feathering slot between the two rings and an enlarged annular lubricant space behind the cylindrical branch and in communication with said slot.

9. A split resilient piston ring of L-shape cross section to provide a branch having flat sides and a cylinder-engaging exterior periphery, and a cylindrical cylinder-contacting branch and having the inner side of the flat-sided branch formed to equalize or neutralize the cross-sectional strains, whereby the cylinder-contacting face of the ring will be maintained cylindrical under contraction.

10. A resilient piston ring of L-shape section to provide a flat branch and a cylindrical branch the interior side of the ring being chamfered to such extent and at such angle as to counter-balance the cross-section strains due to the counterboring imparting the L-shape, whereby to prevent distortion of the ring under contraction.

11. In an internal combustion or other compression engine having a cylinder, the combination of a piston reciprocable in said cylinder, with an annular clearance intervening between the piston and cylinder, the piston being formed with a circumscribing, annular, imperforate ring-receiving groove formed to provide a sealing surface intermediate its sides, and a resilient compression packing ring structure within the groove and having a sealing surface and a feathering passage therethrough for feathering oil from the oil film on the cylinder wall, said ring and piston having surfaces cooperating to form a lubricant receiving reservoir which is in communication with the oil film on the cylinder wall on all strokes of the piston through said feathering passage and which is sealed from the compression space under pressure conditions by the coaction of said sealing surfaces.

In testimony whereof, I have subscribed my name.

HARRY M. BRAMBERRY.